United States Patent
Vila et al.

(10) Patent No.: US 6,757,348 B1
(45) Date of Patent: Jun. 29, 2004

(54) HIGH-SPEED COORDINATED MULTI-CHANNEL ELASTIC BUFFER

(75) Inventors: Diego Fernando Vila, Austin, TX (US); Marcus Sebastian Mateus, Houston, TX (US); Richard B. Umberhocker, Cedar Park, TX (US)

(73) Assignee: Crossroads Systems, Inc., Austin, TX (US)

( * ) Notice: Subject to any disclaimer, the term of this patent is extended or adjusted under 35 U.S.C. 154(b) by 363 days.

(21) Appl. No.: 09/682,673

(22) Filed: Oct. 4, 2001

Related U.S. Application Data
(60) Provisional application No. 60/315,492, filed on Aug. 28, 2001.

(51) Int. Cl.[7] ................ H04L 25/00; H04L 25/40; H04L 7/00
(52) U.S. Cl. ............ 375/372; 370/356; 370/395.72
(58) Field of Search ................ 375/372, 295; 370/395.72

(56) References Cited

U.S. PATENT DOCUMENTS

| | | | | |
|---|---|---|---|---|
| 5,550,874 A | * | 8/1996 | Lee | 375/354 |
| 6,594,329 B1 | * | 7/2003 | Susnow | 375/372 |
| 6,646,991 B1 | * | 11/2003 | Drottar et al. | 370/238 |
| 2002/0176526 A1 | * | 11/2002 | Mejia | 375/372 |

* cited by examiner

*Primary Examiner*—Stephen Chin
*Assistant Examiner*—Harry Vartanian
(74) *Attorney, Agent, or Firm*—Gray Cary Ware & Freidenrich, LLP

(57) ABSTRACT

Systems and methods for enabling data transfers over communications links having a plurality of transmission lanes. In one embodiment, a system comprises a plurality of elastic buffers, each of which is coupled to one of the lanes in the communications link, and a buffer controller coupled to the buffers. Data is clocked into the elastic buffers using a first clock signal and is clocked out of the buffers by a second clock signal. The buffer controller is configured to monitor each of the buffers and to detect impending underflow or overflow conditions. In response to detect in one of these conditions, the buffer controller will cause the words to be added or deleted, respectively, to all of the elastic buffers rather than only the buffer in which the overflow/underflow condition was detected.

24 Claims, 8 Drawing Sheets

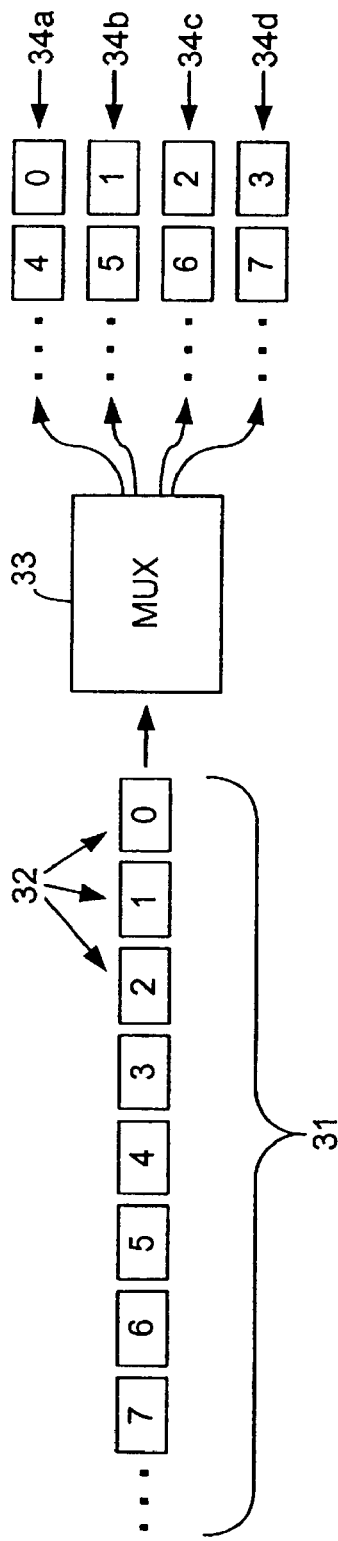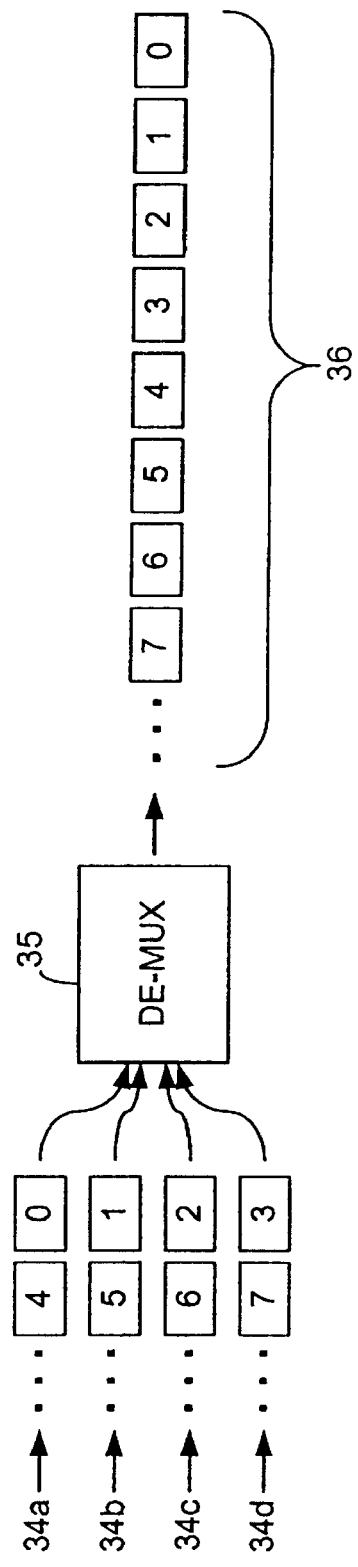
Fig. 3
Fig. 4

HIGH-SPEED COORDINATED MULTI-CHANNEL ELASTIC BUFFER

CROSS REFERENCE TO RELATED APPLICATIONS

This application claims the benefit of U.S.C. 119(e) of provisional application Serial No. 60/315,492 filed on Aug. 28, 2001 entitled "High-Speed Coordinated Multi-Channel Elastic Buffer", which is hereby incorporated by reference as if set forth herein in its entirety.

BACKGROUND OF INVENTION

1. Field of the Invention

The invention relates generally to the transfer of data within computing systems and more particularly to the transfer of data between different time domains using multi-lane communication links.

2. Background of the Invention

Referring to FIG. 1, a point-to-point communications link consists of three basic elements: a transmitter 10; a communications medium 12; and a receiver 14. Generally speaking, transmitter 10 transmits data using a local clock signal. Receiver 14 likewise uses a local clock signal to receive the data, but this clock signal is local to the receiver, and not the transmitter. Put another way, the clock signals used by transmitter 10 and receiver 14 are generated from different sources and are not identical. Transmitter 10 and receiver 14 can therefore be said to reside in different clock domains. (Each clock domain comprises the portion of the system in which the respective clock signal is used as the basis for transferring data or for performing its respective operations.)

While the clock signals in each clock domain may be designed to have the same frequency, it is virtually impossible to generate identical clock signals in any two clock domains. Typically, there is a phase mismatch and a slight frequency mismatch between the clock signals. The phase difference between the two signals can easily be handled by inserting a buffer (sometimes referred to as an elastic buffer) in the communications link so that data is written to the buffer according to the clock signal of the transmitting domain and retrieved from the buffer according to clock signal of the receiving domain. The frequency mismatch between the clock signals is somewhat more difficult to deal with. Because the rate at which data is transmitted over the communications link is not the same as the rate at which data can be received from the communications link, overflow or underflow conditions can result. These conditions can, in turn, cause corruption of the data and failure of the attempted transfer. Even if a buffer is used in the communications link, the difference in the amounts of data transmitted and received is cumulative, and the buffer can eventually overflow or underflow.

The problem of buffer overflow/underflow in a single communications channel can be resolved through the use of fill words which are added to or deleted from an elastic buffer. Fill words are a set of predefined symbols which occupy positions in the data stream, but which do not carry any of the information being transferred (e.g., the IDLE ordered set in the Fibre Channel protocol.) As the amount of data in the elastic buffer increases and the buffer approaches an overflow condition, fill words can be deleted from the output data stream. This effectively allows the output to catch up with the input. As the amount of data in the elastic buffer decreases and the buffer approaches an underflow condition, fill words can be added to the output data stream. This effectively allows slows down the output so that the input can catch up with it.

The problem of buffer overflow/underflow in a multilane communications link, however, cannot be resolved simply by implementing this same solution in each of the lanes of the link. Because there are phase differences between the clock signals which drive the data transfers in the different lanes, fill words are likely to be added to or deleted from some, but not all of the lanes in a single clock period. As a result, the data transferred over one or more of the lanes would be more than one clock cycle out of phase with the remainder of the lanes. Consequently, the data (which was originally multiplexed from a single serial stream to a serial stream for each of the lanes) would be reassembled into a serial stream in the wrong order, corrupting the data stream.

SUMMARY OF INVENTION

One or more of the problems outlined above may be solved by the various embodiments of the invention. Broadly speaking, the invention comprises systems and methods for enabling data transfers over communications links having a plurality of lanes. The various embodiments of the invention generally involve the monitoring of elastic buffers corresponding to the lanes of the communications link to detect approaching overflow and underflow conditions. In response to detecting one of these conditions in any one of the buffers, fill words are added or deleted to the data streams in each of the lanes at approximately the same time to equalize the data input to and output from the buffers and avoid overflow or underflow of the buffers.

In one embodiment, a system comprises a plurality of elastic buffers, each of which is coupled to one of a plurality of lanes in a communications link, and each of which is coupled to a buffer controller. Each of the elastic buffers receives data according to a clock signal derived from a first clock domain. The clock signal for each lane may be out of phase with those of the other lanes. This is due to skew which is introduced between the different clock signals for each lane by the communications link. Data is clocked out of the elastic buffer by a clock signal in a second clock domain. If there is a mismatch between the frequencies of the clock signals in the two clock domains, the amount of data in the elastic buffer will increase or decrease, causing an overflow or underflow condition. The buffer controller is configured to monitor each of the elastic buffers and to detect impending underflow or overflow conditions. In response to detecting one of these conditions, the buffer controller will cause the fill words to be added or deleted, respectively, to all of the elastic buffers, rather than only the buffer in which the overflow/underflow condition was detected.

In another embodiment, a method comprises providing an elastic buffer in the each lane of a multi-lane communications link, monitoring the amount of data in each of the elastic buffers, adding a fill word in each of the elastic buffers in response to detecting that the amount of data in any one of the buffers has reached a predetermined low threshold, and deleting a fill word in each of the elastic buffers in response to detecting that the amount of data in any one of the buffers has reached a predetermined high threshold. Some embodiments of the method may include monitoring one or more of the data streams to identify conditions in which addition or deletion of fill words might be delayed in one or more of the transmission lanes, or might violate constraints of the applicable data transmission protocol.

BRIEF DESCRIPTION OF DRAWINGS

Other objects and advantages of the invention may become apparent upon reading the following detailed description and upon reference to the accompanying drawings in which.

FIG. 3 is a diagram illustrating the multiplexing of a single serial data stream into a plurality of serial data streams suitable for transmission over a multilane communications link in one embodiment;

FIG. 4 is a diagram illustrating the de-multiplexing of multiple serial data streams received over a multi-lane communications link in one embodiment;

Figure 1:
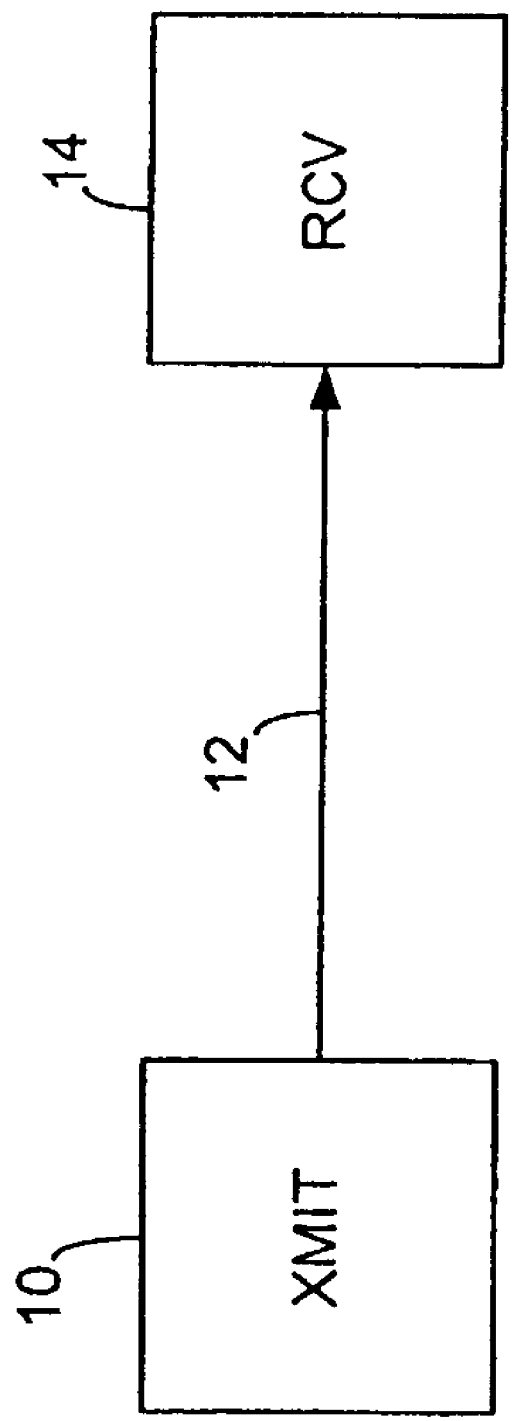
FIG. 1 is a diagram illustrating the communication of data from a transmitting device to a receiving device over a single data transmission lane.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims.

DETAILED DESCRIPTION

A preferred embodiment of the invention is described below. It should be noted that this and any other embodiments described below are exemplary and are intended to be illustrative of the invention rather than limiting.

Broadly speaking, the invention comprises systems and methods for enabling data transfers over communications links having a plurality of lanes. In one embodiment, a system comprises a plurality of elastic buffers, each of which is coupled to one of a plurality of lanes in a communications link, and each of which is coupled to a buffer controller. Each of the elastic buffers receives data which is clocked by a clock signal derived from a first clock domain. The clock signal for each lane may be out of phase with the other lanes. Data is clocked out of the elastic buffer by a clock signal in the second clock domain. If there is a mismatch between the frequencies of the clock signals in the two clock domains, the amount of data in the elastic buffer will increase or decrease, causing an overflow or underflow condition. The buffer controller is configured to monitor each of the elastic buffers and to detect impending underflow or overflow conditions. In response to detect in one of these conditions, the buffer controller will cause the words to be added or deleted, respectively, to all of the elastic buffers, rather than only the buffer in which the overflow/underflow condition was detected.

Figure 2:
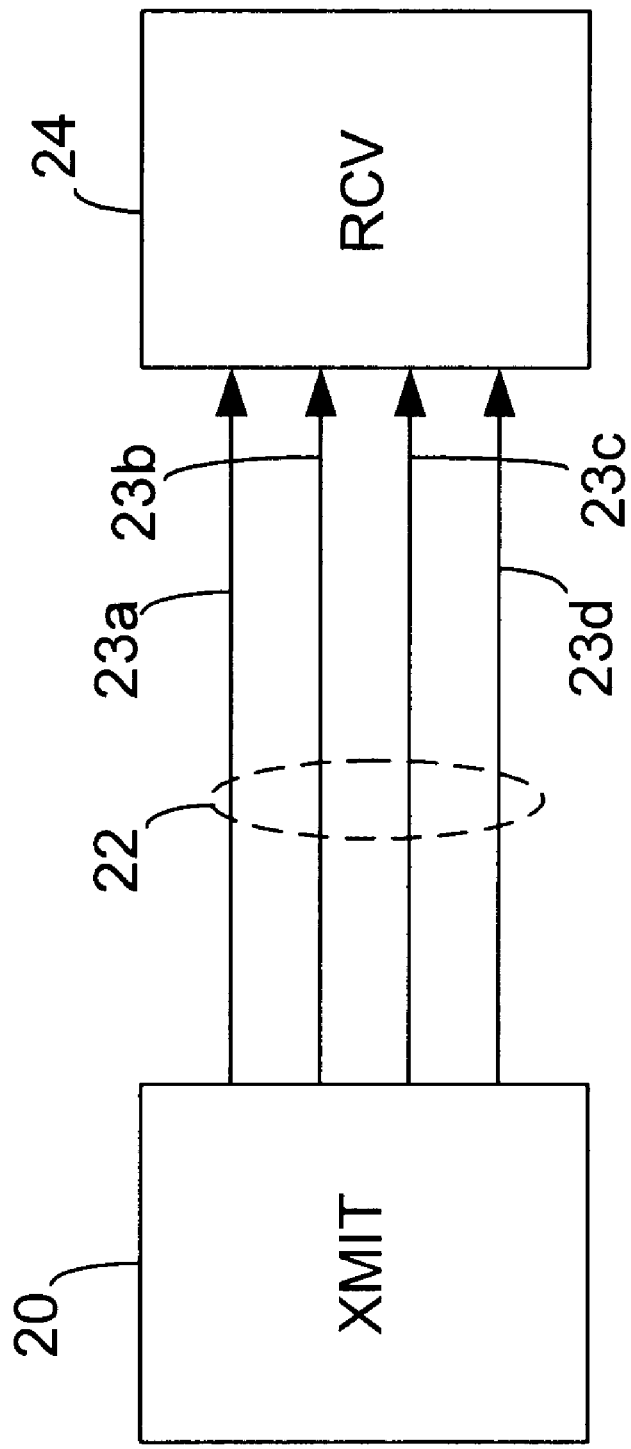
FIG. 2 is a diagram illustrating the communication of data from a transmitting device to a receiving device over a communications link having multiple data transmission lanes.

Referring to FIG. 2, a diagram illustrating a multi-lane communications link is shown. Communications link 22 extends from transmitter 20 to receiver 24. Communications link 22 comprises a plurality of lanes 23. Serial data to be transmitted from transmitter 20 to receiver 24 is multiplexed to create a plurality of separate serial data streams. Each of these new serial data streams is transmitted over one of the lanes 23 of the communications link 22. When the new serial data streams are received by receiver 24, they are demultiplexed to recreate the original serial data stream. This process is shown in more detail in FIGS. 3 and 4.

It should be noted that, for the purposes of this disclosure, identical items in the figures may be indicated by identical reference numerals followed by a lowercase letter, e.g., 23a, 23b, and so on. The items may be collectively referred to herein simply by the reference numeral, e.g., 23.

Referring to FIG. 3, a diagram illustrating the multiplexing of a single serial data stream into a plurality of serial data streams suitable for transmission over a multilane communications link is shown. A first serial stream of data 31 comprises a series of data symbols 32. (Data symbols is used here in a generic sense and, in various embodiments, may comprise bits, bytes, words, frames, packets, or other pieces of data.) A multiplexer 33 operates on data stream 31 to produce a plurality of new serial data streams 34. Each one of the new serial streams can then be transmitted over one of the lanes in a multilane communications link. In the example of FIG. 3, four new data streams are created for transmission over a four-lane communications link. In this embodiment, multiplexer 33 is configured to distribute data symbols 32 among the lanes in a round-robin fashion. In other words, symbol 0 will be assigned to a first data stream, symbol 1 will be assigned to the next data stream, and so on. After a symbol is assigned to the last data stream, the process is repeated. As a result, each data stream comprises a first symbol and every fourth symbol after that. Thus, the first data stream includes symbols 0, 4, 8, etc., while the second data stream includes symbols 1, 5, 9, and so on.

Referring to FIG. 4, a diagram illustrating the de-multiplexing of the multiple serial data streams received over a multi-lane communications link is shown. The plurality of serial data streams 34 which were produced by multiplexer 33 (see FIG. 3) are transmitted over the respective lanes of the communications link and are received by de-multiplexer 35. In this embodiment, de-multiplexer 35 reconstructs the original data stream by reading data symbols 32 from the data streams in a round-robin fashion. In other words, a symbol is read from the first data stream, then the second, and so on, repeating after a symbol has been read from the each of the data streams. The data symbols are thereby re-ordered in their original sequence so that the single serial data stream 36 output by de-multiplexer 35 is essentially identical to the original serial data stream 31. It should be noted that data stream 36 is clocked by the read clock signal instead of the write clock signal, and may therefore have a slightly different frequency than data stream 31. The data streams may also differ as a result of the addition or deletion of fill words, as will be described in more detail below.

Figure 5:
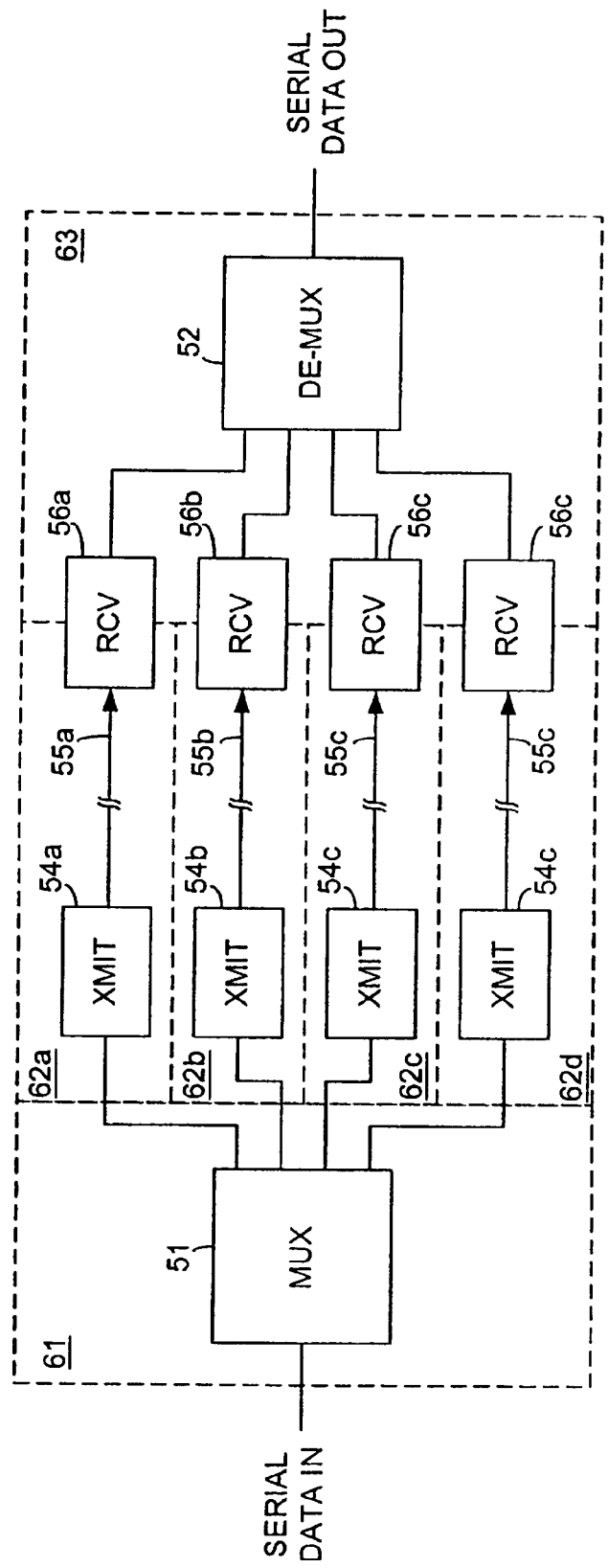
FIG. 5 is a diagram illustrating one embodiment of a multi-lane communications link.

Referring to FIG. 5, a diagram illustrating one embodiment of a multi-lane communications link according to the present invention is shown. In this figure, the communications link comprises a multiplexer 51 and a demultiplexer 52 and which are coupled by a plurality of transmission lanes. Each transmission lane comprises a transmitter 54, a receiver 56 and a transmission medium 55 which is coupled between them. As described above, multiplexer 51 is configured to transform an input serial data stream into a plurality of serial data streams. In this case, multiplexer 51 produces four data streams corresponding to the four transmission lanes of the communications link. Each of the new data streams is conveyed to one of the transmitters 54, which drives the data onto the corresponding transmission medium 55.

Multiplexer 51 is incorporated into a first device (or a first portion of a device) and is driven by a first clock signal. There may be a number of circuits or other components (collectively referred to herein as components) which are also driven by the same clock signal. These components are said to be within the clock domain 61 of the first clock signal. Transmitters 54 are normally incorporated into the same device (or portion of the device) as multiplexer 51, but typically do not use the same clock signal. Instead, a new clock signal is generated for each transmitter. While these new clock signals are normally generated from the first clock signal and have the same frequency as the first clock signal, they may be slightly out of phase with each other (e.g., as a result of variations in timing resulting from gate delays, connectors, uneven traces, etc.) This phase difference is referred to as clock skew. Because each transmitter runs on a slightly different clock signal, each transmitter can be considered to be in a different clock domain than the original clock domain 61. These clock domains are identified by reference numerals 62a 62d.

The data transmitted via transmission lane 55 is received at receiver 56. Receiver 56 incorporates an elastic buffer which provides a means for the data to be bridged from one clock domain 62 to a second clock domain 63. Data is written into the elastic buffer according to the clock signal of domain 62, and it is read out of the buffer according to the clock signal of domain 63. Accordingly, receiver 56 is illustrated as straddling clock domains 62 and 63. The data is read out of the buffers of the transmission lanes and forwarded to de-multiplexer 52, which reconstructs the data into a single serial data stream.

The use of the elastic buffer is necessary in this embodiment because the clock signals for clock domains 62 and 63 are independent of each other. They are not generated from a single clock signal, nor are they derived from each other. Consequently, they may have slightly different frequencies, even though they are designed to operate at identical frequencies. Because the clock frequencies can be different, data may either be written into the buffer faster than it is read out, or it may be read out faster than it is written into the buffer. This will cause data to either accumulate in the buffer (potentially causing data overflow,) or be depleted from the buffer (potentially causing data underflow.) The greater the difference between the frequencies of the two clock signals, the sooner the data overflow or underflow will occur.

As previously indicated, the elastic buffer may be implemented separately from the deskewing system in other embodiments. In other embodiments, the clocks signals may be generated from a single clock, in which case the read and write frequencies will be identical, and the elastic buffer may not be needed.

As noted above, the problems of buffer overflow and underflow in a single, independent communications channel can be resolved through the use of fill words. Fill words are special predefined symbols or character sets which are added to or deleted from a data stream. The fill words do not carry any of the information which is desired to be transmitted over the communications link. The fill words instead simply fill space between the useful data symbols. The fill words are used in conjunction with an elastic buffer to equalize the data input to and output from the buffer.

The elastic buffer is configured to store data which is transferred over a corresponding data channel (or lane, in the case of a multi-lane communications link.) Data is written to the buffer and, at some later time, that same data is read out of the buffer. Depending on the latency of the data in the buffer, there will be a certain amount of data in the buffer at any given time. Typically, it is desirable for the buffer to operate within a range around half of the capacity of the buffer. For example, if the buffer has a capacity of eight bytes, the buffer may be ideally operated with 4 bytes (plus or minus 1–2 bytes) in the buffer.

If the rate at which data is written to the buffer and the rate at which data is read out of the buffer are the same, the amount of data in the buffer at any given time will remain essentially constant. In the case of data transfers from one clock domain to another, however, the rates at which data is written to the buffer and read out of the buffer normally are not the same. While the clock frequencies (hence the data transfer rates) may be very close to each other, they most likely are not exactly identical. Consequently, the data will either be written to the buffer faster than it is read out of the buffer, or it will be read out of the buffer faster than it is written to the buffer.

If the data is written to the buffer faster than it is read out of the buffer, the buffer will eventually run out of locations to which data can be written (an overflow condition.) In a FIFO implementation, there may simply be no additional locations to which data can be written after the FIFO is filled. In a circular buffer implementation, new data may overwrite data which has not yet been read out of the buffer. In either instance, data will be lost.

If the data is read out of the buffer faster than it is written to the buffer, the buffer will eventually run out of data to read (an underflow condition.) In a FIFO implementation, the first entry in the FIFO will be read repeatedly, sometimes after new data is written to it, and sometimes not. In a circular buffer implementation, some data locations will be read twice. Again, in either instance, the data will be corrupted.

Overflow and underflow conditions can be prevented through the use of fill words. Fill words are incorporated into the data stream so that they appear at regular intervals between data symbols. The transfer rate of the data can be adjusted by deleting fill words which are already in the data stream (thereby increasing the effective data rate) or by inserting additional fill words into the data stream (thereby reducing the effective data rate.) The regularity and/or frequency with which they appear in the data stream is typically defined by the protocol of the data transfer. It should be noted that the present systems and methods are protocol-neutral and may be used in environments which employ such protocols as Fibre Channel, Infiniband or Ethernet.

The insertion and deletion of fill words in a circular buffer implementation is accomplished through the manipulation of a read pointer associated with the elastic buffer. The read pointer indicates the storage location of the data to be read out of the buffer. After the data in the location indicated by the pointer is read out of the buffer, the pointer is adjusted to point to the next storage location, which contains the next piece of data in the stream. If it is desired to delete a fill word, the storage location preceding a fill word is read, then the read pointer is advanced by two locations instead of one so that the data in the skipped location (the fill word) is not read out of the buffer. If it is desired to add a fill word to the data stream, the storage location containing a fill word is read, then, instead of advancing the read pointer, it stays on the location containing the fill word. After the fill word is read a second time (thereby adding a fill word to the data stream,) the read pointer is advanced to the next storage location. (It should be noted that the skipping or re-reading of storage locations containing fill words can be accomplished in a similar manner in a FIFO implementation.)

Figure 6:
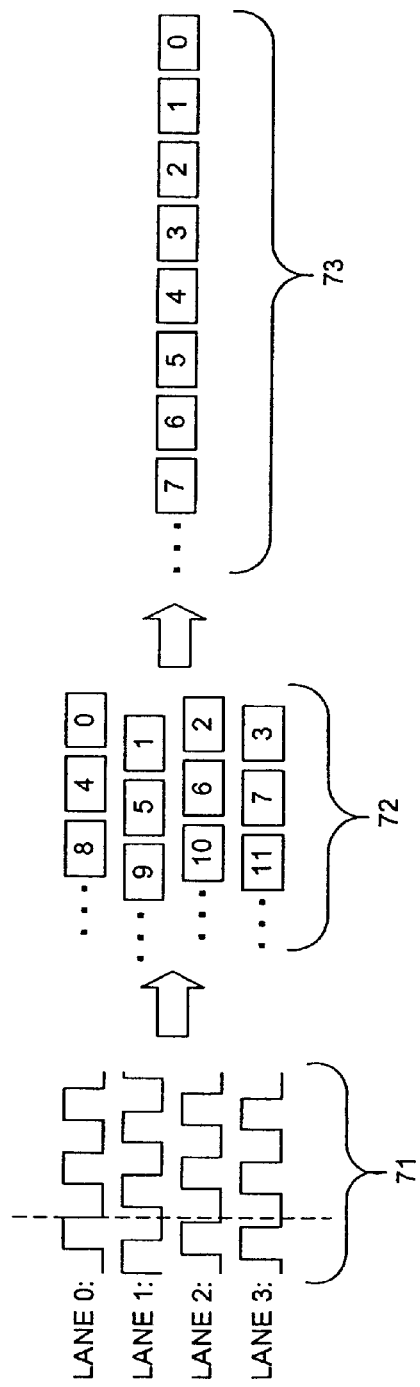
FIG. 6 is a diagram illustrating the timing associated with data symbols transmitted over each of four transmission lanes in one embodiment.

Referring to FIG. 6, a diagram illustrating the timing associated with data symbols transmitted over each of four transmission lanes is shown. As indicated above, each transmission lane is typically associated with a clock signal that is derived from the same parent clock signal. As illustrated in FIG. 5, the clock signals corresponding to clock domains 62a 62d are all derived from the clock signal corresponding to clock domain 61. Because the clock signals for the transmission lanes are derived from the same parent signal, they have identical frequencies. They may, however, be skewed with respect to each other. In other words, there may be a phase difference between them.

The clock signals 71 corresponding to each of the transmission lanes are shown at the left side of FIG. 6. It can be seen in this figure that the clock signals corresponding to lanes 1–3 lag behind the clock signal of lane 0 by varying amounts. If clock signals 71 are used to drive data onto the respective transmission lanes, the data symbols 72 will be skewed in the same manner as the clock signals (assuming the transmission delay for each lane is the same.) When the data symbols are stored in elastic buffers corresponding to each of the transmission lanes, however, they can be read out of the buffers in the same order that they originally appeared in the input data stream. Thus, the data stream 73 output from the communications link is identical to the input data stream (though it may differ in phase and/or frequency.)

Figure 7:
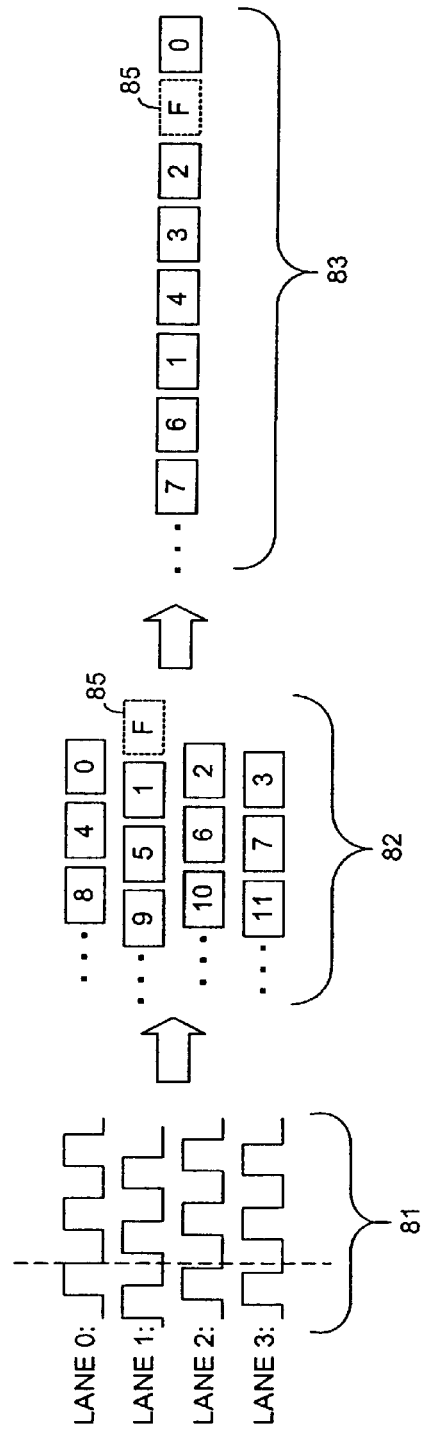
FIG. 7 is a diagram illustrating the manner in which data may be corrupted by adding a fill word to a single one of a plurality of transmission lanes in one embodiment.

Referring to FIG. 7, a diagram illustrating the manner in which data may be corrupted by adding a fill word to a single transmission lane is shown. In this figure, the clock signals used to transmit data over each of the transmission lanes are assumed to be the same as shown in FIG. 6. If clock signals 81 have a frequency which is slightly less than the frequency of the clock in the receiving device (i.e., if the data is written to the elastic buffer more slowly than it is read out of the buffer,) the buffers will approach an underflow condition. Because the clock signal corresponding to lane 1 lags behind the clock signals corresponding to the other lanes, the data in the buffer corresponding to lane 1 will reach an the underflow condition more rapidly than the buffers in the other lanes. Consequently, if each transmission lane is configured to independently determine whether fill words should be added or deleted, lane 1 will likely meet the criteria for adding a fill word prior to the other lanes. If the fill word is added in lane 1, but not in the other lanes, the resulting data streams 82 which are provided to the receiving device from the individual transmission lanes will appear as shown in FIG. 7. It can be seen from this figure that, while the data in lane 0 begins with the symbols 0, 4, 8, the data in lane 1 begins with the fill word (F) 85, then continues with symbols 1, 5, 9. If the demultiplexer in the receiving device reads the data symbols from the buffers in each of the transmission lanes in a round-robin fashion, the resulting output data stream 83 will have all of the data symbols corresponding to lane 1 shifted backward in the data stream by one symbol, and the data stream will be corrupted.

Figure 8:
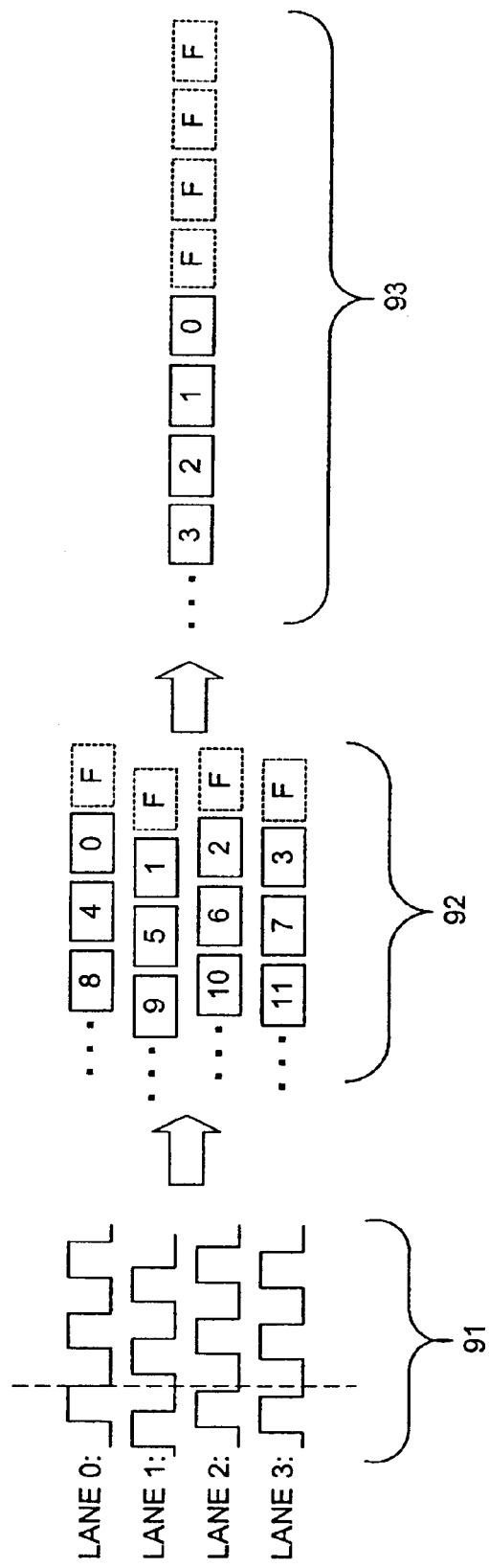
FIG. 8 is a diagram illustrating the addition of fill words to all of the transmission lanes of a communications link in one embodiment.

Referring to FIG. 8, a diagram illustrating the addition of fill words to all of the transmission lanes of a communications link is shown. This figure shows the clock signals 91 associated with the different transmission lanes. These clock signals are identical to those shown in FIGS. 6 and 7. FIG. 8 shows the addition of fill words to all of the transmission lanes, rather than the only to a single one of the lanes. When fill words are added to each of the lanes, the receiving device is able to demultiplex the data from the different transmission lanes and reconstruct the data into a stream 93 which accurately represents the data stream which was originally multiplexed and transmitted over the lanes. (Accurate as used here refers to the correct ordering of the data symbols within the data stream, notwithstanding the addition of the fill words.)

The present systems and methods are designed to ensure that, whenever fill words are added to or deleted from the data stream, they are added to or deleted from each of the transmission lanes, so that the data stream output from the communications link will not be corrupted. This is achieved by monitoring the amount of data in the elastic buffers coupled to each of the transmission lanes, detecting when the amount of data in any one of the buffers reaches a threshold level, and adding a fill word or deleting a fill word from the data stream in each one of the transmission lanes.

Figure 9:
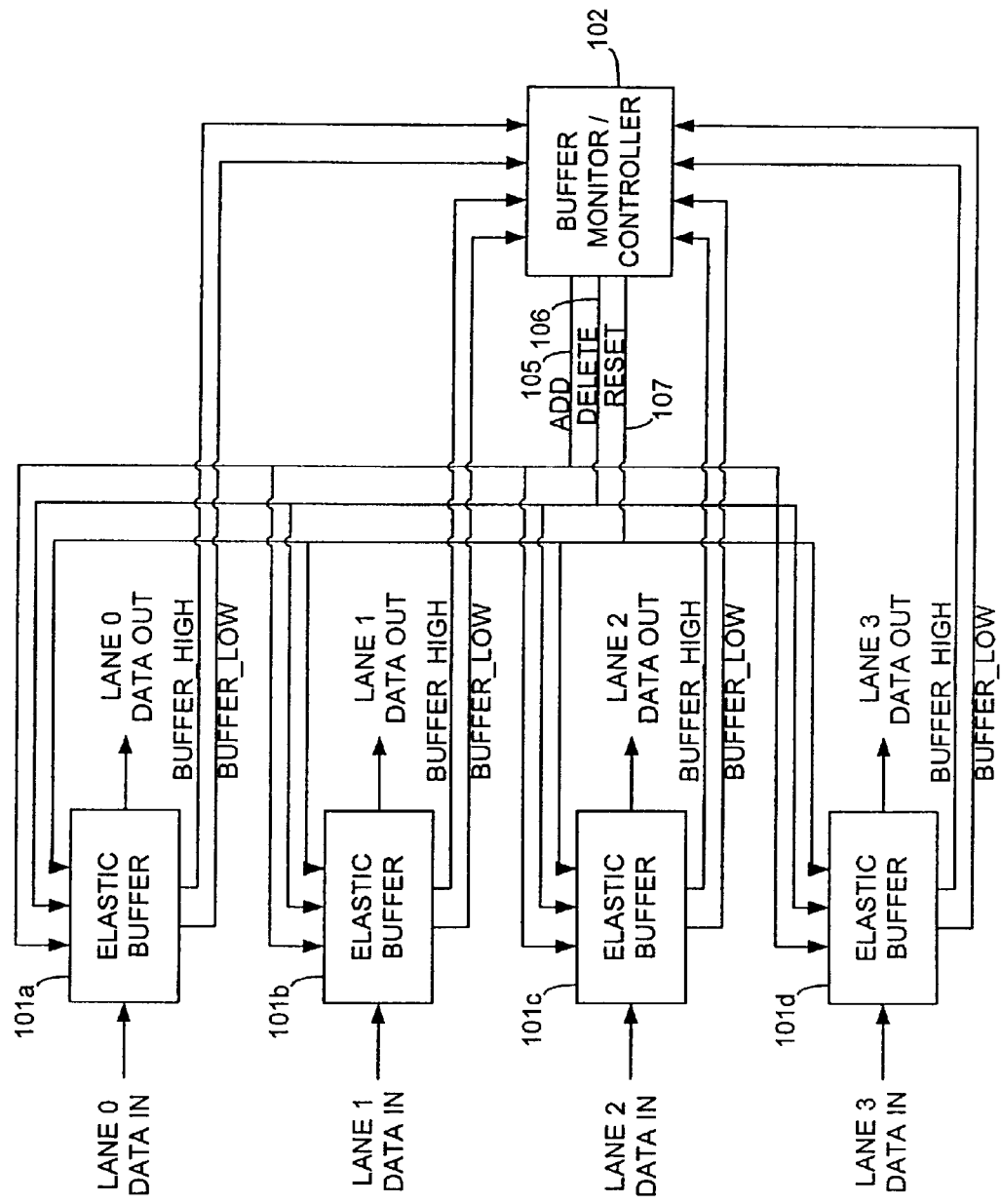
FIG. 9 is a diagram illustrating the configuration of a buffer system in one embodiment.

Referring to FIG. 9, a diagram illustrating the configuration of the buffer system in one embodiment is shown. The system shown in this figure is configured to be coupled to a communications link having four transmission lanes. It should be noted that the system is scalable and can be used with multi-lane communications links having more or less than four lanes.

The buffer system includes an elastic buffer corresponding to each of the transmission lanes. In the illustrated system, buffer 101a is coupled to transmission lane 0, buffer 101b is coupled to transmission lane 1, buffer 101c is coupled to transmission lane 2, and buffer 101d is coupled to transmission lane 3. Each elastic buffer 101 is configured to receive data from the corresponding transmission lane. The data is written into the corresponding buffer at the clock frequency of the transmission lane. Data is read out of the elastic buffer at the clock frequency of the receiving device. The data is conveyed from the elastic buffers to a demultiplexer which reassembles the data from each of the buffers into a single serial data stream.

Each elastic buffer 101 has a plurality of signal lines coupled between the buffer and a buffer controller 102. In the illustrated embodiment, two of the signal lines are used to convey signals from the buffer to the controller, and three of the signal lines are used to convey signals from the controller to the buffer. The signals which originate at the buffer include a BUFFER_HIGH signal and a BUFFER_LOW signal. The $BUFFER_{13}$ HIGH signal, when asserted, indicates that the amount of data in the buffer has reached an upper threshold. The BUFFER_LOW signal, when asserted, indicates that the amount of data in the buffer has reached a lower threshold. The signals which originate at the buffer controller include an ADD signal, a DELETE signal and a RESET signal. The ADD signal, when asserted, indicates that each of the elastic buffers should add a fill word to the corresponding data stream. The DELETE signal, when asserted, indicates that each of the elastic buffers should delete a fill word from the corresponding data stream.

The RESET signal, when asserted, indicates that each of the elastic buffers should reset itself.

In one embodiment, each buffer is configured to store up to eight bytes of data. In operation, each buffer should be approximately half full (i.e., it should have about four bytes of data stored therein.) The amount of data in each buffer will vary, depending upon the rates at which data is written to the buffer and read out of the buffer. Preferably, the amount of data should not vary by more than about two bytes. Thus, the threshold values which are defined for the buffers in this embodiment may be two bytes for the low threshold and six bytes for the high threshold. If the amount of data in the buffer reaches (or falls below) two bytes, the BUFFER_LOW signal is asserted to indicate that the buffer is approaching a data underflow condition. If the amount of data in the buffer reaches (or exceeds) six bytes, the BUFFER_HIGH signal is asserted to indicate that the buffer is approaching a data overflow condition.

The signal lines which carry the BUFFER_HIGH and BUFFER_LOW signals from each of elastic buffers 101 are coupled to buffer controller 102. Buffer controller 102 is configured to monitor each of these signal lines and to detect the assertion of the BUFFER_HIGH or BUFFER_LOW signals for any of buffers 101. If a BUFFER_HIGH signal is asserted by any of the buffers, the buffer controller is configured to assert a DELETE signal on line 106. Line 106 is coupled as an input to each of elastic buffers 101. Elastic buffers 101 are configured to delete a fill word from the corresponding data stream in response to the assertion of the DELETE signal by buffer controller 102. Thus, whenever any one of buffers 101 reaches the high threshold, buffer controller 102 causes every one of the buffers to delete a fill word.

Similarly, if a BUFFER_LOW signal is asserted by any of elastic buffers 101, buffer controller 102 is configured to assert an ADD signal on line 105. Line 105 is coupled as an input to each of the elastic buffers. The elastic buffers are configured to add a fill word to the corresponding data stream in response to the assertion of the ADD signal by the buffer controller. As a result, whenever any one of the elastic buffers reaches the low threshold, the buffer controller causes every one of the buffers to add a fill word.

The embodiment of the buffer system illustrated in FIG. 9 is also configured to generate a RESET signal. This signal may be asserted in response to a number of conditions which require the buffer system to be reset (e.g., manual initiation of a reset by a user.) When the RESET signal is asserted, each of elastic buffers 101 resets itself. If the system employs circular buffers, for instance, the read and write pointers may be reset to predetermined positions. After the RESET signal is deasserted, the buffers allow a predetermined amount of data to be written into the buffer before reading of the data out of the buffer is started. The predetermined amount is typically about half of the capacity of the buffer midway between the high and low threshold values. The difference between these values should be sufficient to allow fill words to be added or deleted without requiring immediate performance of the opposite operation. In other words, The minimum and maximum thresholds of the buffers should not be so close that, when one buffer reaches the high threshold and a fill word is deleted from each buffer, another buffer is caused to reach the low threshold.

The present systems and methods may be implemented in communications links which employ various protocols, such as Fibre Channel, Infiniband and Ethernet. The protocol which is used in a particular implementation may place certain constraints on these systems and methods. For example, in the Fibre Channel protocol, data which is transferred across a communications link comprises a set of data words. This set of data words is referred to as a frame. Fill words can only be located between frames they cannot be interspersed with the data words in the frames. (It should be noted that the use of the term "frame" is intended to be exemplary and should be construed to refer to packets or other groupings of data which might be used in other protocols.)

Because the fill words in this embodiment can only be located between frames of data, the buffers and/or the buffer controller must be configured to maintain this positioning. While this does not present any unusual problems in the deletion of fill words (the position constraints cannot be violated by elimination of an existing fill word,) this is not true for the addition of fill words. The buffers and/or buffer controller must be configured to detect the appropriate inter-frame positions and insert the new fill words in those positions. This is complicated somewhat by the fact that the fill words need to be added to each of the transmission lanes at approximately the same time. If an ADD signal is asserted by the buffer controller when one of the transmission lanes is at an inter-frame position, but another one of the transmission lanes has already advanced to the subsequent frame, a fill word might be added to the data stream in the first transmission lane, but not the second. This would skew the two data streams with respect to each other until the fill word was added to the data stream of the second transmission lane. (Likewise, if fill words were deleted at different times, the data could be skewed with respect to each other.) The single data stream which was reconstructed from these two data streams would therefore be corrupted. The buffer controller should therefore be configured in this embodiment to determine whether assertion of the ADD or DELETE signals would allow each of the transmission lanes enough time to insert or delete fill words in the same inter-frame space. If this would not be possible, the buffer controller should delay assertion of the respective signal until it would result in insertion/deletion of the words across all transmission lanes. Because data frames in many protocols have fixed lengths, this may be accomplished in some embodiments by determining how much of each current data frame has been received, and only asserting an ADD or DELETE signal if a predetermined amount of the current data frame is remaining. In other embodiments, this may be accomplished by detecting the end of frame (EOF). The magnitude of the delay may depend upon the protocol and the time which is required for the buffers to respond to these signals.

While, as indicated above, the deletion of a fill word will not violate constraints on the positions of fill words, it may violate constraints on the allowable number of fill words between frames. Some protocols specify that the number of fill words between any two data frames should be within a certain range (e.g., 2–6.) If, between two frames, there are only the minimum number of fill words, then none of the fill words should be deleted. In this instance, the buffers and/or buffer controller should therefore be able to identify the number of fill words in the inter-frame space and, if necessary, delay removal of the fill word until it will not violate this constraint. Similarly, the addition of a fill word may need to be delayed if the inter-frame space being considered already has the maximum allowable number of fill words.

Figure 10:
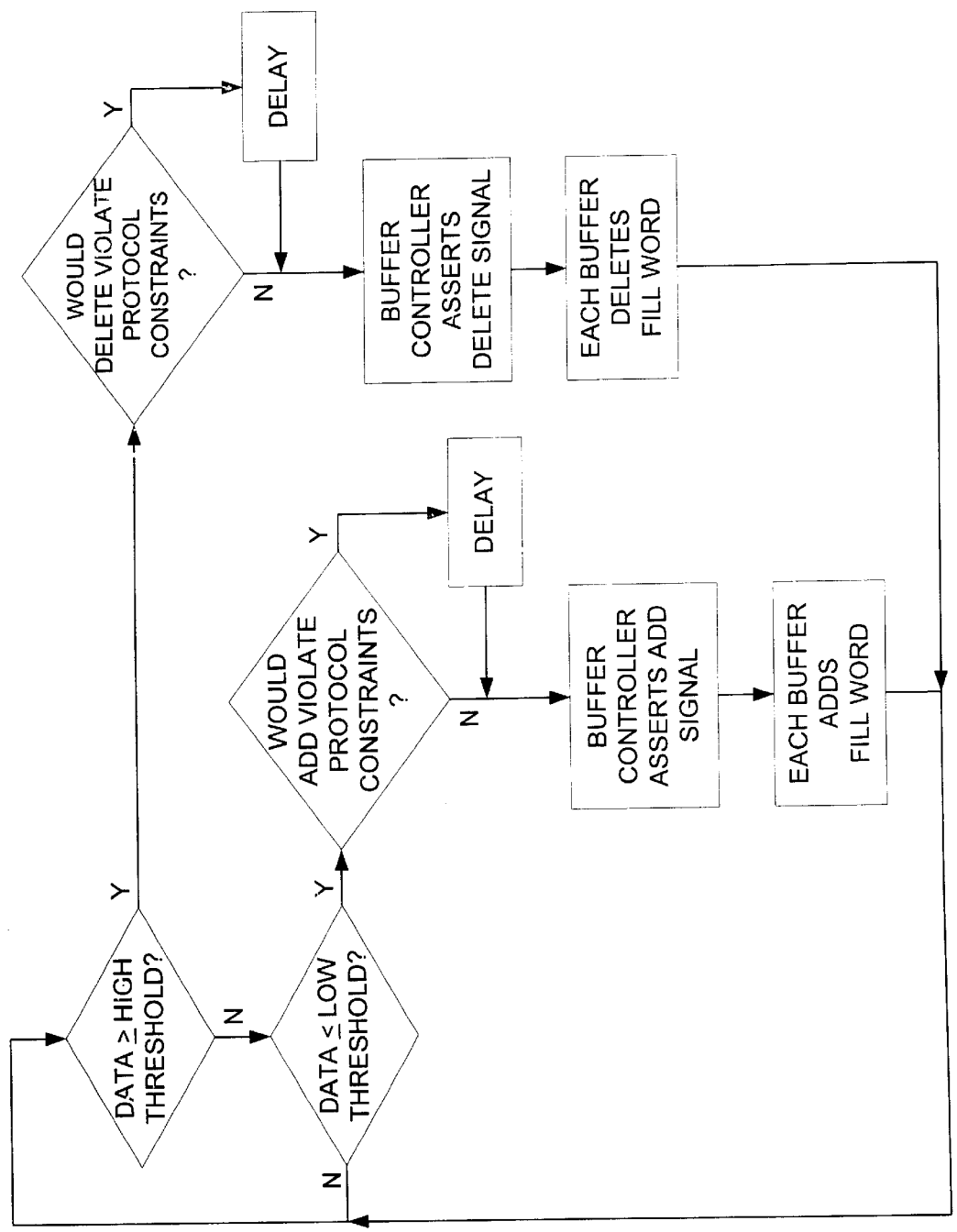
FIG. 10 is a flow diagram illustrating one embodiment of the present method.

Referring to FIG. 10, a flow diagram illustrating one embodiment of the present method is shown. This method corresponds generally to the operation of the system described above. In this method, the buffers are monitored to detect amounts of data in the buffers which reach the predefined thresholds (either high or low.) If all of the buffers are between the thresholds, the buffer controller simply continues to monitor them. If one of the buffers reaches the high threshold, a fill word needs to be deleted, so the buffer controller determines whether the fill word can presently be deleted without violating the constraints of the protocol which is being used. If deletion of a fill word from any of the buffers would violate the protocol constraints, the deletion is delayed. If no violation would occur, the DELETE signal is asserted, and each of the buffers deletes a fill word from the corresponding data stream. The buffer controller then continues to monitor the buffers to detect amounts of data which reach the thresholds.

Similarly, if one of the buffers reaches the low threshold, a fill word needs to be added to each buffer. The buffer controller therefore determines whether a fill word can currently be added without violating the protocol constraints. If the addition of a fill word to any one of the buffers would violate the protocol constraints, the addition is delayed. If no violation would occur, the ADD signal is asserted, and each of the buffers adds a fill word to the corresponding data stream. The buffer controller then continues to monitor the buffers.

It should be noted that, in other embodiments, these functions may occur in a different order, and may be performed by different components. For example, in the embodiment described above, the buffer controller determines whether addition or deletion of a fill word would violate the protocol constraints, then asserts the appropriate signal at the appropriate time. In another embodiment, the buffer controller might first assert the condition or deletion signal as a means for querying the buffers for information relating to violation of the protocol constraints, then instruct the buffers to insert or delete fill words as necessary, depending upon the responses received from the buffers. The buffers could alternatively be configured to communicate directly with each other to coordinate the addition or deletion of fill words.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A buffer system for a multi-lane communications link comprising:
   a plurality of buffers, wherein each buffer is coupled to a corresponding lane of the communications link, wherein each buffer is configured to receive data at a rate corresponding to a write clock signal associated with the received data, wherein received data is removed from the buffer at a rate corresponding to a read clock signal, and wherein a low threshold and a high threshold are defined for each of the buffers; and
   a buffer controller coupled to each of the buffers, wherein the buffer controller is configured to monitor each of the buffers and to detect when data in any of the buffers reaches one of the thresholds;
   wherein the buffer controller is configured to add a fill word to each of the buffers in response to detecting that data in any one of the buffers has reached the low threshold; and
   wherein the buffer controller is configured to delete a fill word from each of the buffers in response to detecting that data in any one of the buffers has reached the high threshold.

2. The buffer system of claim 1 wherein each of the buffers has eight storage locations and wherein the low threshold is two storage locations.

3. The buffer system of claim 1 wherein each of the buffers has eight storage locations and wherein the high threshold is from five to six storage locations.

4. The buffer system of claim 1 wherein the buffer controller is configured to add a fill word by rereading one of the fill words in the buffer.

5. The buffer system of claim 1 wherein the buffer controller is configured to delete a fill word by skipping one of the fill words in the buffer.

6. The buffer system of claim 1 wherein the buffer controller is configured to determine an expected amount of time before fill words are received and to assert a command signal to add or delete a fill word if the expected amount of time is greater than a predetermined amount of time.

7. The buffer system of claim 1 wherein the buffer controller is further configured to inhibit the command signal to add or delete the fill word if the expected amount of time is less than the predetermined amount of time.

8. The buffer system of claim 1 further comprising a first clock signal generator coupled to the buffers and configured to generate a first clock signal, wherein each of the buffers is configured to read data out at a rate determined by the first clock signal.

9. The buffer system of claim 1 further comprising a second clock generator, coupled to the communications link and configured to generate a separate clock signal corresponding to each of the lanes, wherein the buffer corresponding to each lane is configured to store data therein at a rate determined by the corresponding separate clock signal.

10. The buffer system of claim 1 wherein the high and low thresholds of the buffers are set at values which are sufficiently distant to allow addition or deletion of a fill word to each buffer without thereby causing any of the buffers to reach the high or low thresholds.

11. The buffer system of claim 10 wherein the difference between the high and low thresholds is greater than or equal to the maximum skew between the lanes, plus one storage location.

12. The buffer system of claim 1 wherein the buffer controller is configured to detect the end of a first frame and to add or delete a fill word between the first frame and a following frame.

13. The buffer system of claim 1 wherein the buffer controller is configured to monitor inter-frame spaces and to add or delete fill words only where doing so would not violate a data transfer protocol of the communications link.

14. A method to for avoiding overflow and underflow of elastic buffers in a multi-lane communications link comprising:
   providing an elastic buffer in each lane of a multi-lane communications link;
   monitoring the amount of data in each of the elastic buffers;
   in response to detecting that the amount of data in any one of the buffers has reached a low threshold, adding a fill word in each of the elastic buffers; and
   in response to detecting that the amount of data in any one of the buffers has reached a high threshold, deleting a fill word in each of the elastic buffers.

15. The method of claim 14 wherein each of the buffers has eight storage locations and wherein the low threshold is two storage locations.

16. The method of claim 14 wherein each of the buffers has eight storage locations and wherein the high threshold is from five to six storage locations.

17. The method of claim 14 wherein adding a fill word comprises rereading one of the fill words in the buffer.

18. The method of claim 14 wherein deleting a fill word comprises skipping one of the fill words in the buffer.

19. The method of claim 14 determining an expected amount of time before fill words are received and asserting a command signal to add or delete a fill word if the expected amount of time is greater than a predetermined amount of time.

20. The method of claim 14 further comprising generating a separate write clock signal for each of the buffers from a single source clock signal, writing data into each of the buffers according to the corresponding write clock signal, and reading data out of each buffer according to a single read clock signal.

21. The method of claim 14 further comprising setting the high and low thresholds at values which are sufficiently distant to allow addition or deletion of a fill word to each buffer without thereby causing any of the buffers to reach the high or low thresholds.

22. The method of claim 21 wherein the difference between the high and low thresholds is greater than or equal to the maximum skew between the lanes, plus one storage location.

23. The method of claim 14 further comprising detecting the end of a first frame and adding or deleting a fill word between the first frame and a following frame.

24. The method of claim 14 monitoring inter-frame spaces and adding or deleting fill words only where doing so would not violate a data transfer protocol of the communications link.

* * * * *